(12) United States Patent
Tracey et al.

(10) Patent No.: US 7,188,121 B2
(45) Date of Patent: Mar. 6, 2007

(54) INFORMATION SYSTEM MANAGEMENT

(75) Inventors: David Christopher Tracey, Drogheda (IE); Brian Joseph Gillespie, Drumcondra (IE)

(73) Assignee: Sun Microsystems, Inc., Santa Clara, CA (US)

( * ) Notice: Subject to any disclaimer, the term of this patent is extended or adjusted under 35 U.S.C. 154(b) by 774 days.

(21) Appl. No.: 10/359,790

(22) Filed: Feb. 6, 2003

(65) Prior Publication Data

US 2004/0158838 A1    Aug. 12, 2004

(51) Int. Cl.
*G06F 17/00* (2006.01)
*G06F 7/00* (2006.01)
*G06F 15/173* (2006.01)

(52) U.S. Cl. ............... 707/103 R; 707/101; 709/238

(58) Field of Classification Search ............ 707/103 R, 707/10, 100, 101; 709/238
See application file for complete search history.

(56) References Cited

U.S. PATENT DOCUMENTS

| | | | |
|---|---|---|---|
| 6,493,719 | B1 | 12/2002 | Booth et al. |
| 6,581,012 | B1* | 6/2003 | Aryev et al. .................. 702/22 |
| 2002/0161923 | A1* | 10/2002 | Foster et al. ................. 709/239 |
| 2003/0005090 | A1 | 1/2003 | Sullivan, Jr. et al. |
| 2003/0028269 | A1* | 2/2003 | Spriggs et al. ................ 700/83 |
| 2003/0084093 | A1* | 5/2003 | Grason et al. ............... 709/203 |
| 2004/0064721 | A1* | 4/2004 | Murching et al. .......... 713/200 |

FOREIGN PATENT DOCUMENTS

| | | |
|---|---|---|
| EP | 0996253 A3 | 8/1999 |
| EP | 1061446 | 12/2000 |
| WO | 02/01395 | 1/2002 |
| WO | 2003/005665 | 1/2003 |

OTHER PUBLICATIONS

Sunsite.uakom.sk/sunworldonline/swo1-11-1996/swol-11-connectivity.html, "WBEM and JMAPI on the rise" Rawn Shah, Nov. 1996.
Proceedings of the IEEE Third International Workshop on Systems Management, Apr. 22-24, 1998, Cherkaou et al, "Towards a modular and interoperable SNMPv3", pp. 26-31.
Search Report, Application No. GB0330259.3 dated May 27, 2004.

* cited by examiner

*Primary Examiner*—John Cottingham
*Assistant Examiner*—Kuen S. Lu
(74) *Attorney, Agent, or Firm*—Meyertons Hood Kivlin Kowert & Goetzel, P.C.; B. Noël Kivlin

(57) ABSTRACT a provider module provides an interface between an object manager or object handler and each of a plurality of management modules. The provider module can include a register manager operable to maintain a register of interfaced management modules and a router operable to use the register to provide routing of a management request to a management module appropriate to process the management request. Sharing the provider module between a plurality of management modules facilitates the creation and integration of the management modules and provides a dynamic management system.

24 Claims, 10 Drawing Sheets

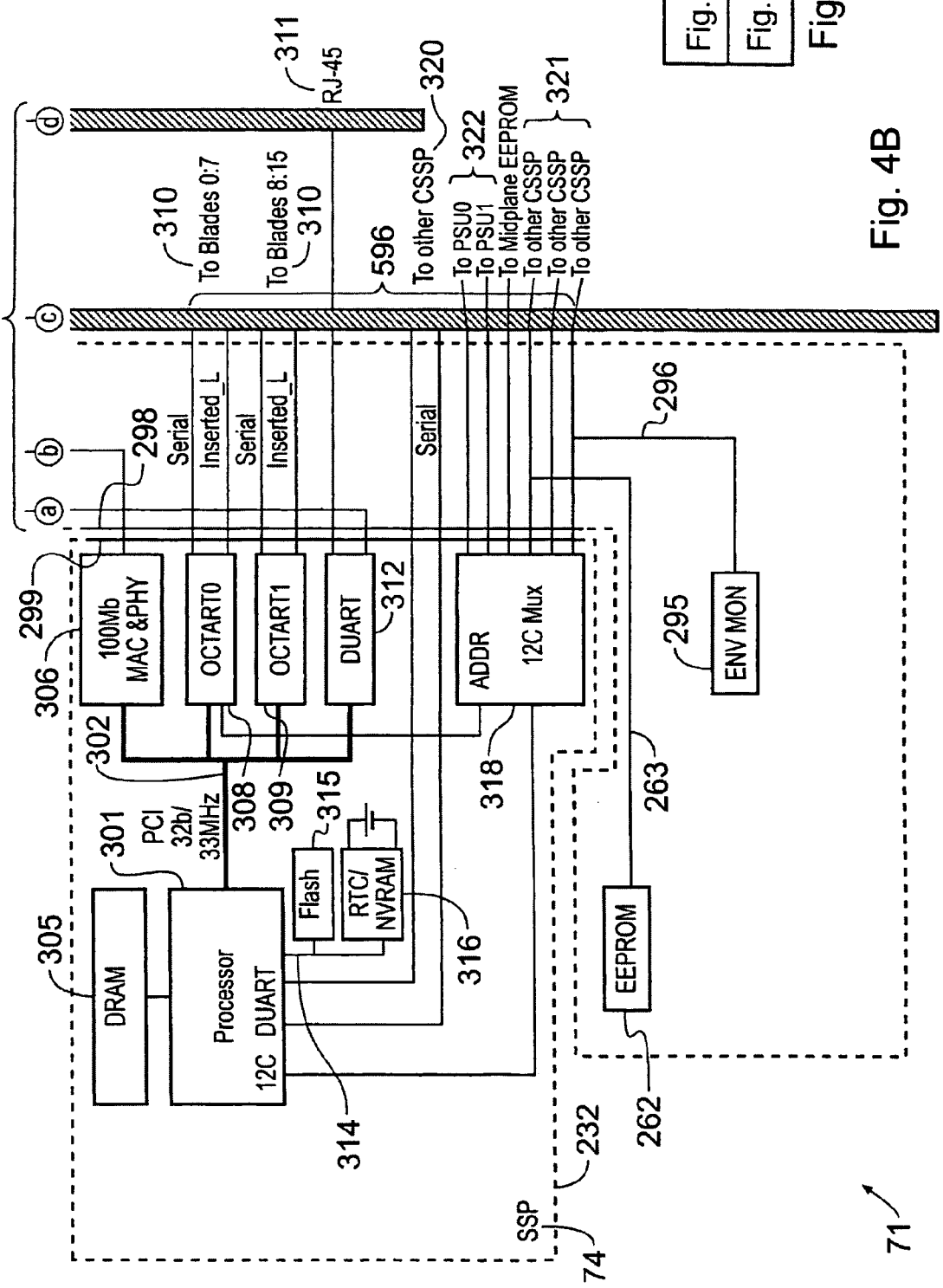

INFORMATION SYSTEM MANAGEMENT

BACKGROUND OF THE INVENTION

This invention relates to the management of information systems.

A collection of resources or components within an information system can typically be represented as a set of managed objects. Such a representation can be helpful for management, for example for remote management of part or all of the system.

The Common Information Model (CIM) is a model for describing overall management information in a network/enterprise environment. The CIM is used to enable, for example, the remote management of elements of the system over a network. The CIM could be thought of as a data dictionary for systems and network management, providing labels for entities, attributes, relationships, and actions and documenting how these properties are interconnected. The CIM includes a CIM Specification and a CIM Schema.

The CIM Specification defines details for integration with other management models. As a result, the CIM Specification enables other management schemas to be mapped to its data structures. The CIM Specification includes naming conventions, mapping techniques, and a Meta Schema, which establishes the rules for defining the Schema.

The CIM Schema represents elements of managed objects including logical and physical objects. CIM is a data model. As result it is not tied to a particular programming language or protocol. The CIM Schema can be represented in text files structured according to the Managed Object Format (MOF), which is a language for defining CIM management information.

In order to implement a management application using the CIM, a CIM Object Manager (CIMOM) is typically used, the CIMOM typically being implemented on a single computer in a system forming part of or connectable to a system to be managed. The CIMOM intermediates between management applications or consoles, a data repository, and individual data sources and operates as a form of central dispatcher and facilitator. For performance reasons, a CIMOM is typically designed for a specific operating system in order to provide good performance and access to low-level events in the operating environment.

One example of a CIMOM is provided for the Solaris 8 operating system from Sun Microsystems. The Solaris Web-Based Enterprise Management (WBEM) Services software includes: the CIMOM; a MOF compiler that can parse ASCII MOF statements and add compiled classes and instances to a CIM repository, which forms a central storage area for CIM information managed by the CIMOM; the CIM Schema, which consists of Java classes that describe managed objects in the Solaris Operating Environment; and CIM Providers, which support communications between the Solaris Operating Environment and the CIMOM.

In the Solaris implementation, multiple providers can be loaded via shared libraries and a specific loader. The multiple providers are each essentially static, being created at initialization. Providers are special classes that communicate with managed resources, such as disk drives and CPUs, to access data and then forward the data to the CIMOM for integration and interpretation. They can relieve the CIMOM, the primary WBEM agent that coordinates Solaris WBEM Services, by assuming the task of managing distinct subsets of WBEM resources. When the CIMOM receives a request for data from an application that is not available in the CIMOM Repository, it forwards the request, using the provider interfaces, to the appropriate provider.

Providers create, modify, and delete instances rather than classes (which serve as templates for the instances). Instances can exist in persistent storage or be used dynamically.

Although providers have their own process and memory and perform work delegated by the CIMOM, the CIMOM must know the location of each provider in order to perform its task of coordinating WBEM. The CIMOM therefore needs to be informed about each new or modified provider by including those providers in MOF file. A MOF file defines the classes and instances that a provider supports.

The functions of providers include providing data to management applications. When a management application requests data about a managed resource that is not available in the CIM Object Manager Repository, the CIM Object Manager forwards the request to a provider. The provider accesses the data from the managed resource and passes the data back to the CIMOM. The functions of providers also include the control of management resources. When a management application sends data to the CIMOM to control a managed resource, the CIMOM passes the data to the appropriate provider.

An interface is required between the providers and each of the modules providing instrumentation (instrumented modules) for representing CIM classes. The interfaces are non-standard, and need to be provided by the instrumented modules. Also, the instrumented modules, and their creators, need to be aware of all of the complexities of the CIM model. The creation of the multiple providers does not rely on the use of shared libraries, but does provide a general API that modules with CIM data can use.

The present invention seeks to further improve system management in a dynamic system environment.

SUMMARY OF THE INVENTION

An aspect of the invention provides a provider module for an information system. The provider module can be operable to provide an interface to each of a plurality of management modules. The provider module can include a register manager operable to maintain a register of interfaced management modules and a router operable to use the register to provide routing of a management request to a management module appropriate to process the management request.

The provision of a provider module that is shared between a plurality of management modules means that functionality for interfacing a management module to a management model can be concentrated at a shared component. This facilitates the creation of management modules as this does not then need to know about how to interface with the management model. The provider module can be thought of as an applications program interface (API) to the management modules. The management modules can, for example, be described as instrumented modules where, for example, they are operable to provide instrumentation functions.

Providing a standard interface between the provider module and each of the management modules also facilitates the creation and integration of management modules.

The register manager can further be operable to maintain in the register at least one of class information and instance information. The router can be operable to use the registered class and/or instance information to determine a routing for the management request to a management module appropriate to process the management request.

The management module can be an instrumented module providing instrumentation functions.

Another aspect of the invention provides a management subsystem comprising a provider module (e.g., as discussed above), at least one management module, and an object handler, the object handler being connectable to a network, being operable to receive a management request and being responsive thereto to call the service provider to route the management request to a management module appropriate to process the management request.

In one example, the object handler can be configured to be responsive to CIM management requests.

A further aspect of the invention provides a management module for such a management subsystem, the management module being operable to register objects owned by the management module with a provider module with which it is registered.

Another aspect of the invention provides a method of managing objects in an information system, the method comprising an instrumented module registering instances of objects owned by the instrumented object with a provider shared between a plurality of instrumented modules.

A further aspect of the invention provides a computer program comprising program code operable to implement the provider module and/or the method as described above. The computer program can be provided on a carrier medium.

Further aspects and advantages of the invention will become apparent from the following description of a preferred embodiment.

BRIEF DESCRIPTION OF THE DRAWINGS

Embodiments of the present invention will be described hereinafter, by way of example only, with reference to the accompanying drawings in which like reference signs relate to like elements and in which:

FIG. 4, which is formed by combining FIGS. 4A and 4B, is a functional block diagram of components of an example of field replaceable unit in the form of a combined switch and service processor module;

Figure 1:
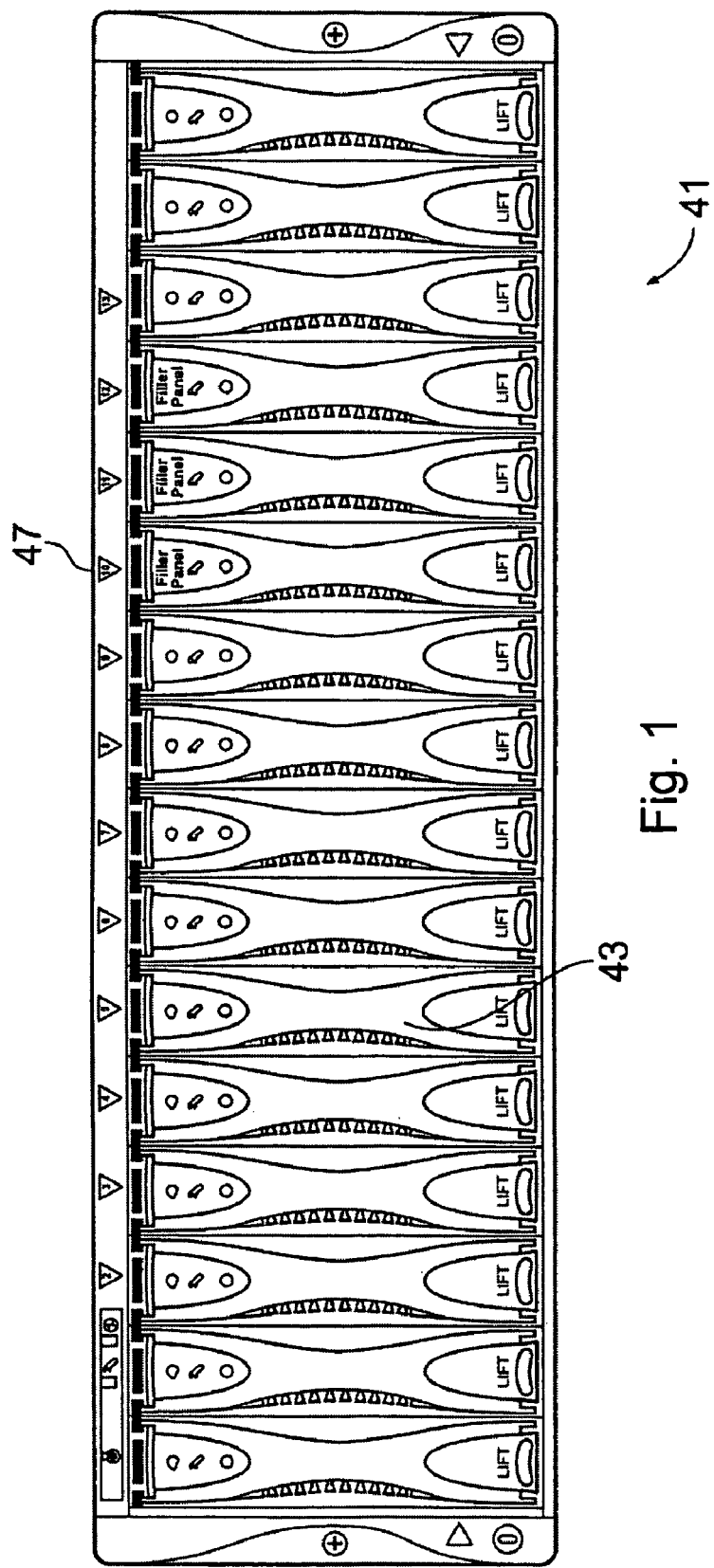
FIG. 1 is a schematic representation of a front view of an example of a carrier forming a rack mountable shelf carrying a plurality of field replaceable units.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

An embodiment of the invention provides a mechanism that facilitates system management for a complex system by providing an interface between an object manager and management objects in a flexible, extensible and dynamic manner. Before describing an embodiment of the present invention, there follows a description of an example of a multiprocessor computer system in which the present invention may be implemented. It should be noted that the system to be described is merely one example of a system in which the present invention may be implemented and that the invention could be applied to the management of other types and configurations of systems.

FIG. 1 is a front view of an example of a rack mountable shelf 41 that forms a carrier configured to carry a plurality of information processing cartridges 43 located side by side along the front of the shelf 41. The term "shelf" is used herein in a conventional way to describe a structure that is mountable in rack system and is configured to carry one or more components to form at least a part of a rack-mountable system.

This example of a shelf 41 has a single enclosure, or housing 47, that houses a number of modular units or subsystems, the majority of which are replaceable in the field and are therefore known as Field Replaceable Units (FRUs). These modular units include the information processing cartridges, or blades 43. Each information processing cartridge 43 in the present example is operable as a server. In the described examples, the information processing cartridges are configured as robust enclosed modules.

In the present example of a shelf, up to sixteen information processing cartridges 43 can be installed in respective receiving locations in the front face of the shelf 41. The number of information processing cartridges 43 actually installed in any installation is dependent upon the system configuration required.

Figure 2:
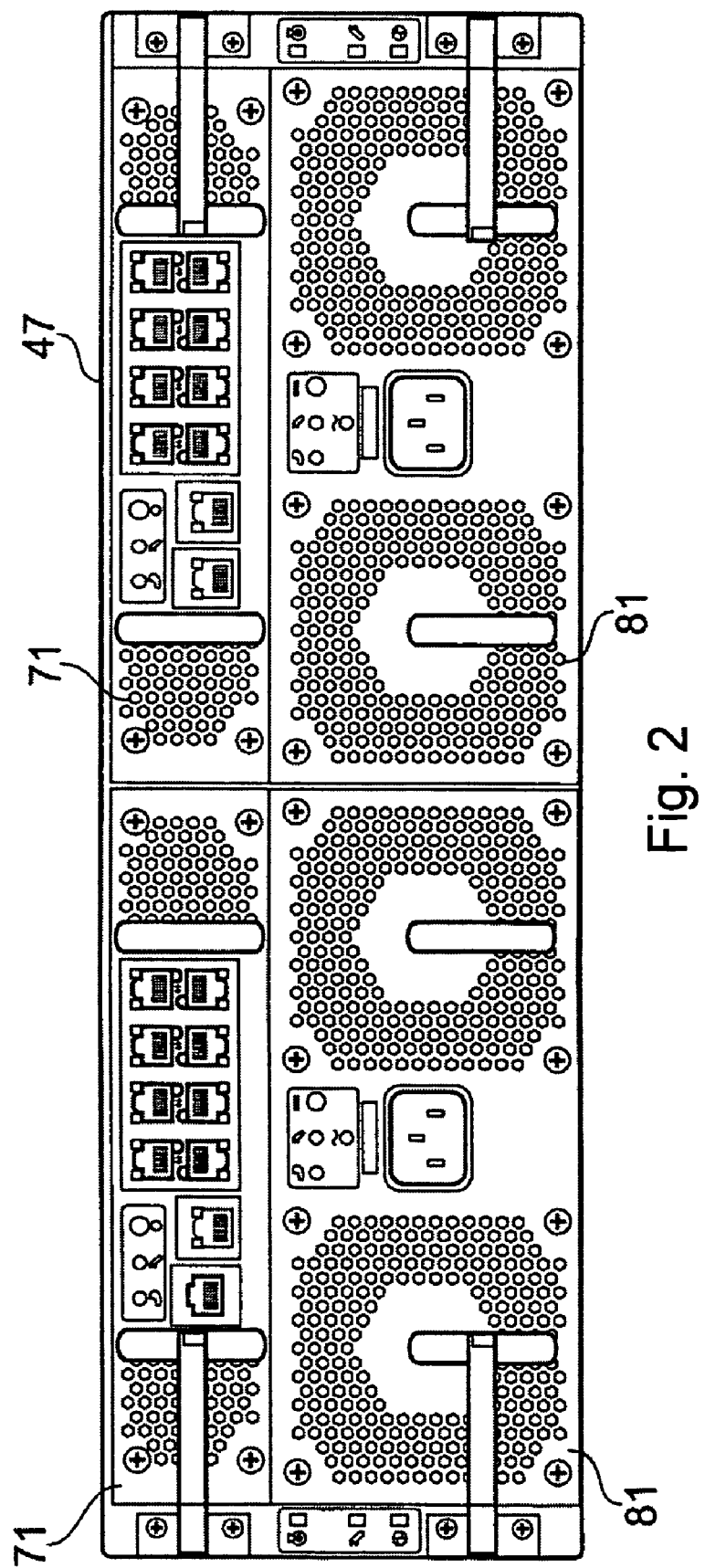
FIG. 2 is a rear view of the shelf of FIG. 1.

FIG. 2 illustrates the rear of the shelf unit of FIG. 1. This shows two different types of FRU 71 and 81 (4 units in total) that have been inserted into respective apertures and in the rear of the shelf enclosure 47. The FRUs shown in FIG. 2 include two Combined Switch and Service Processors (CSSPs) 71 and two Power Supply Units (PSUs) 81.

A midplane (not shown) is provided in the shelf enclosure 47 to interconnect the information processing cartridges to the FRUs mounted in the rear of the shelf 41.

Figure 3:
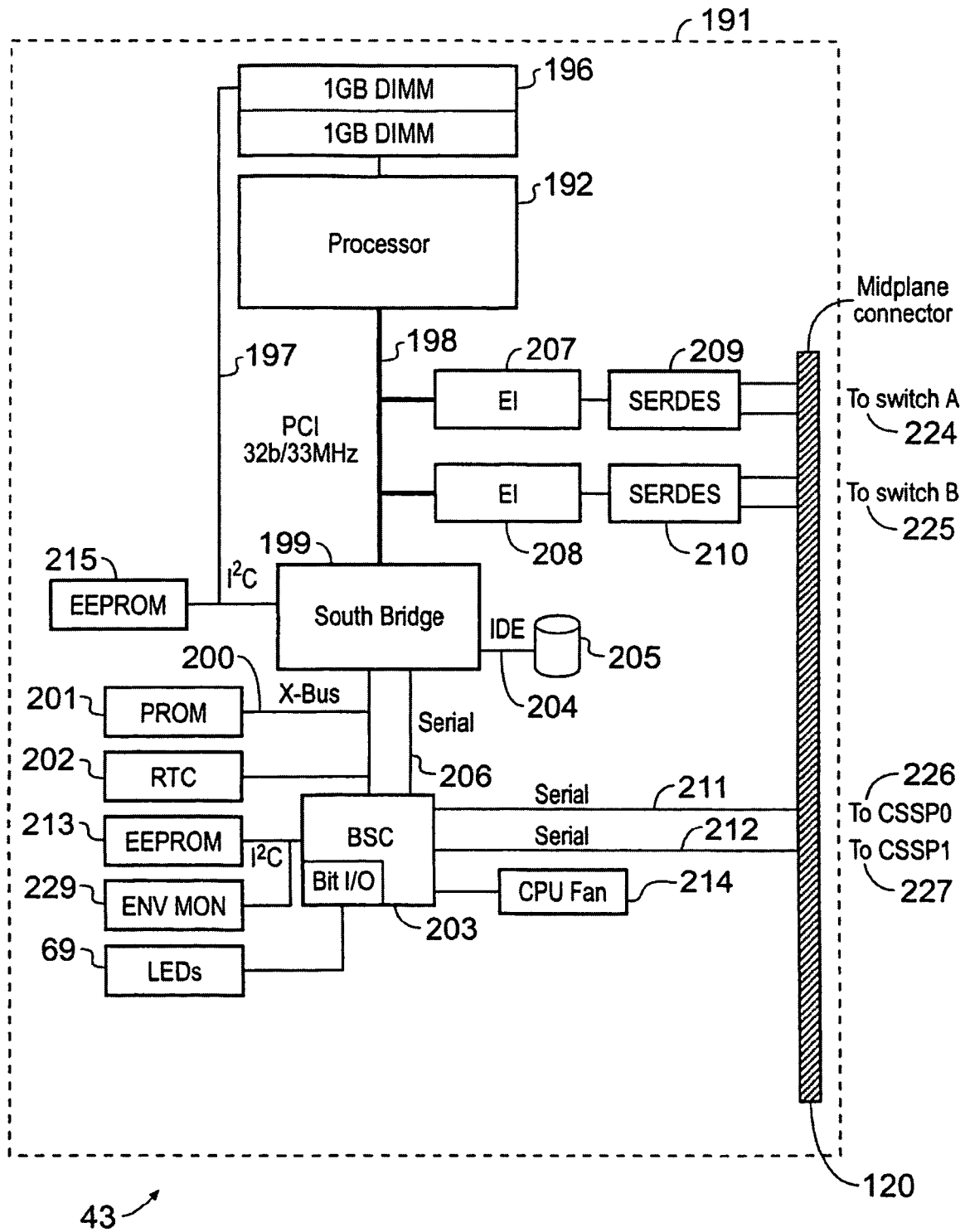
FIG. 3 is a functional block diagram of components of an example of field replaceable unit in the form of an information processing subsystem.

With reference to FIG. 3, there now follows a description of functional elements of an example of an information processing cartridge 43 as contained within an information processing cartridge enclosure.

A microprocessor 192 (e.g., an UltraSPARC™ processor) can be mounted on an information processing cartridge motherboard 191. Memory (e.g., dynamic random access memory (DRAM)) 196 can be provided.

A PCI bus 198 can connect microprocessor 192 to a so-called SouthBridge bus bridge 199. This is a standard form of bus bridge that provides the following functions: an SM Bus interface over an I2C bus 197 for access to a SPD (Serial Presence Detect) feature of the memory 196 that allows initialization of the memory controller; an Xbus interface for access via an Xbus 200 (which is a packet switched multiprocessor bus) to a PROM 201, a real time clock (RTC) 202 and an information processing cartridge service controller (hereinafter termed a Blade Service Controller (BSC)) 203; an IDE (Integrated Drive Electronics) interface that provides an ATA-100 (AT Attachment) IDE connection 204 to an IDE disk drive 205; and a serial console interface on a service bus 206 to the BSC 203 that is used for operating system functions including a console function with this embodiment.

A midplane connector 120 can establish connections between the information processing cartridge 43 and the midplane. These can include information signal connections 224 and 225, via Ethernet interfaces 207 and 208 and SERializer/DESerializers (SERDESs) 209 and 210. Asynchronous serial connections 211 and 212 can provide for communication between the BSC 203 and service processor parts of the CSSPs 71 via serial management signal connections 226, 227.

Internal data storage can be provided by the disk drive 205, which can hold an operating system (e.g., a Solaris operating system) and other software and data for performing information processing using the microprocessor 192.

The BSC 203 can provide various functions, including for example: dual access (for the information processing cartridges and the CSSPs 71) to the PROM 201 and an EEPROM 213 for boot information and a FRU-ID for the information processing cartridge; channeling communication between an information processing cartridge 43 and the service processor part of the CSSPs 71; control of power on reset (POR), system reset and externally initiated reset (XIR) to the microprocessor 192; control of power, service-required and ready-to-remove LEDs 69; upgrading of field-upgradable firmware, via the serial interface; a watchdog function for the operating system; monitoring the speed of a CPU fan 214; and communications with an EEPROM 215 and the operating system via the Xbus 200. An environmental monitor sensor 229 can monitor the CPU and ambient temperatures.

Figure 4A:
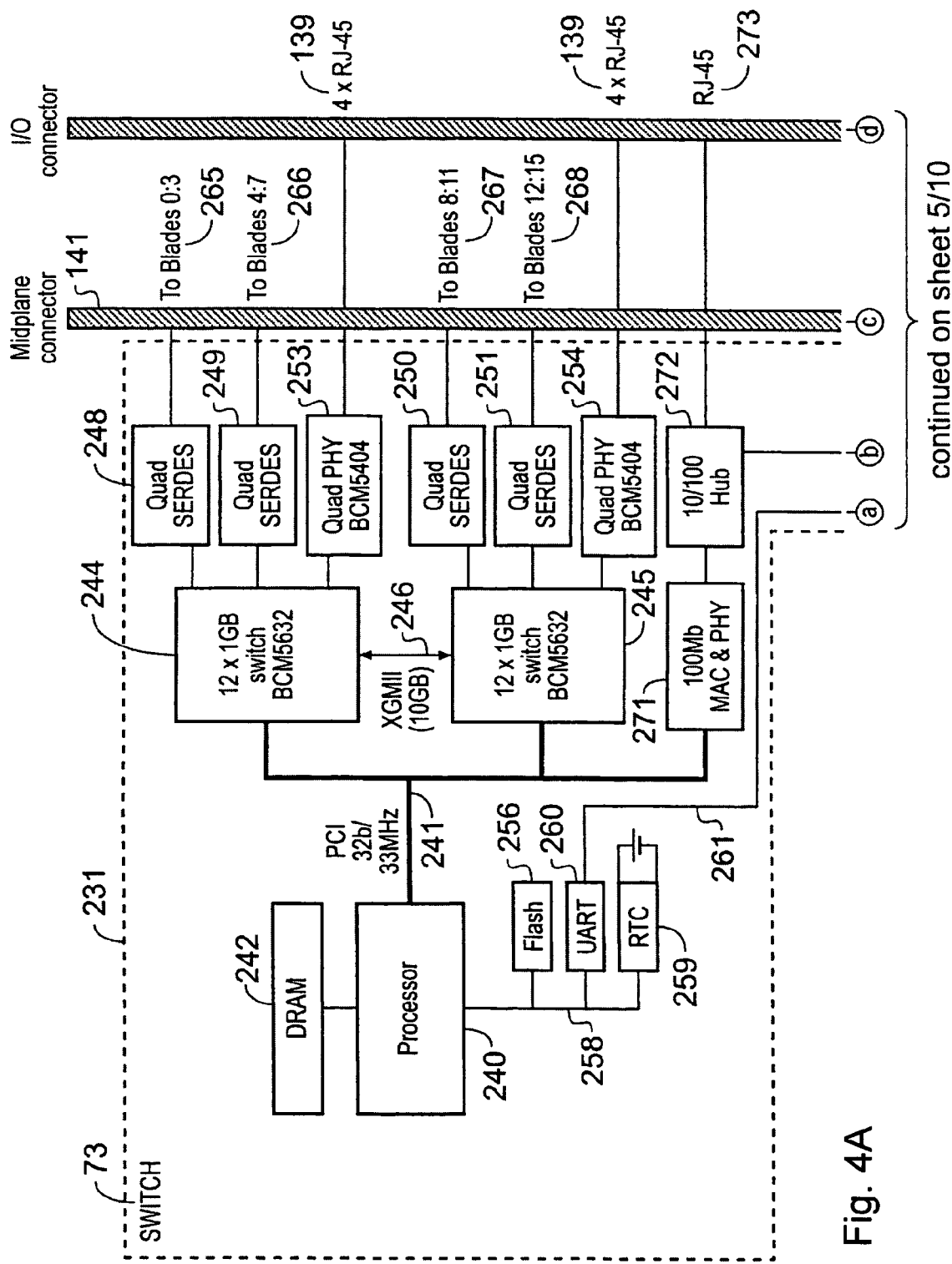

With reference to FIGS. 4A and 4B, there now follows a description of an example of a combined switch and service processor (CSSP) 71, which provides the functionality of a Switch 73 and of a Shelf Service Processor (SSP) 74. Most of the components relating to the Switch 73 are mounted on a Switch PCB 231, and the components relating to the SSP 75 are provided on a SSP PCB 232. However, components located in the lower portion of the switch PCB 321 (i.e., that portion below the SSP PCB 232 as illustrated in FIG. 4B) logically belong to the SSP 74, rather than to the switch 73. The switch PCB 231 carries the components associated with the switch, and it also carries the power, FRU-ID and environmental monitoring components along with the connectors for connections to the midplane and external connectors.

The functional elements of the Switch portions 73 of a CSSP 71 will now be described.

A switch microprocessor 240 with DRAM memory 242 can be provided. The processor 240 can be connected to a PCI bus 241. A flash PROM 256, accessible via an XBus 258, can store a real time operating system, and management and configuration data for the microprocessor.

The midplane connector 141 on the CSSP 71 establishes the connection between the CSSP 71 and the midplane 171. Switch ASICs (application specific integrated circuits) 244, 245 can provide Ethernet interfaces for uplinks and downlinks and an interface for chip-to-chip communication (bridging) 246 between the ASICs 244 and 245. Four quad SERDES 248–251 can allow each information processing cartridge 43 to communicate with the switch 73. Two quad PHYs 253 and 254 provide for external communication via RJ-45 connectors 139 on an IO connector panel.

A UART (Universal Asynchronous Receiver Transmitter) 260 interconnects the XBus 258 to a serial bus 261 for providing an asynchronous console connection from the switch 73 to the SSP 74 that is accessible to the SSP. An integrated MAC/PHY (Media Access Control/Physical) switch 271 can interface the PCI bus 241 to an Ethernet hub 272. The hub 272 can be operable to provide a management interface to the SSP 74 and a connection from an external management network to the switch 73 and SSP 74 of a given CSSP 71. The hub 272 can connect to an RJ45 connector 273 on the IO connector panel. An EEPROM 262 can be used to store the FRU-ID and is accessible by the SSP portion 74 of each CSSP 71 via a serial bus 263 and the midplane 171.

There now follows a description of functional elements of the Shelf Service Processor (SSP) portion 74 of a CSSP 71.

Communication between the Switch PCB 231 and the SSP PCB 232 is facilitated by an interboard connector pair 298 and 299.

The SSP 74 includes a microprocessor 301 (e.g., a Power PC processor) mounted on the SSP printed circuit board (PCB) 232. The processor 301 can be connected to a PCI bus 302. The processor 301 can also comprise a DUART to provide a redundant serial link to the SSP 74 of the other CSSP 71. The processor 301 can be provided with a DRAM memory 305. A flash PROM 315 can store a real time operating system, and management and configuration data for the microprocessor 301.

An integrated MAC/PHY switch 306 can interface the PCI bus 302 to the *frax*;10;100 E*thernet* hub 272 via the interboard connectors 298, 299. O*ctal* UART*s* 308 and 309 can be connected between the PCI bus 302 and serial connections 310 on the midplane connector 141 via the interboard connector pair 298, 299. T*he Octal* UARTS 308, 309 can facilitate serial communications between the SSP 74 and each of the processing cartridges 43. A dual UART (DUART) 312 can be connected between the PCI B*us* 302 and serial bus 261 via the interboard connectors 298, 299 to provide an asynchronous console connection from the SSP 74 to the switch 73. T*he* DUART 312 can also have an I2C connection to an external connector on the rear face 122 of the CSSP enclosure to provide a common operating system/boot console and command port 311.

To facilitate I2C communications between the SSP 74 and the other CSSP 71, the midplane and the PSUs 81, a multiplexer 318 can be provided. The multiplexer 318 can have a single I2C connection to the processor 301 and connections, via the interboard connector pair 298, 299 and the midplane connector 141 to both PSUs 81, the midplane 171 and the other CSSP 71.

The environmental monitor ENV MON 295 can be provided to maintain operational integrity of the CSSP 71 and can communicate with the SSP 74 of both CSSPs via an I2C bus 296.

There now follows a brief description of the Power Supply Units (PSUs) 81. These can be configured such that when two or more PSUs 81 are connected in parallel in the shelf 41, failure of any one of the paralleled units shall not affect system operation. Moreover, one of the PSUs can be installed or removed from a "live" system with or without input power applied. The outputs can have overcurrent protection. The PSU can have an I2C interface to provide power supply status via the midplane 171. The PSU can have an internal temperature sensor that reports via the I2C interface. The PSU fan speed can also be monitored and errors are reported via the I2C interface. Overvoltage and overcurrent sensors can also report via the I2C interface.

An example of data and control connectivity of the shelf 41 to and from computer systems external to the shelf 41 when the shelf 41 is arranged for use within a multiprocessor server system will be described with reference to FIG. 5.

In the present example each processing cartridge, or blade, 43 is connected to the switch 73 of each CSSP 71 by an information signal connection (e.g. a 1 Gb Ethernet link) formed by a combination of links 224, 225 from the processing cartridge 43 to the midplane 171, connections within the midplane 171 and links 265–268 from the midplane 171 to each switch 73. Further, a set of serial management signal connections comprising links 320, 321 and connections within the midplane 171 connect the SSP 74 of each CSSP 71 to the SSP 74 of the other CSSP 71.

To provide external data connectivity between the shelf 41 and an external core data network 330, in association with which all information processing performed by the processing cartridges 43 of the shelf 41 is undertaken, connections 331 can be formed between the core data network 330 and the eight Ethernet ports provided on the rear panel 122 of the CSSP enclosure.

In the present example, the connections by means of which control and configuration of the shelf 41 are performed are entirely separate to the connections to the core data network 330. Therefore, a first external switch 335 can connect to a management (I2C) port 273 of the first CSSP 71 and a second external switch 336 can connect to a management (I2C) port 273 of the second CSSP 72. As described above with reference to FIG. 4, the management port 273 can provide a management network interface to both the switch 73 and SSP 74 of each CSSP 71. The external switches 335, 336 can each be connected to each of a pair of System Management Server (SMSs) 338, 339. The SMS is not essential to the operation of the shelf 41, but use thereof aids optimal operation of the shelf 41. In a typical multiprocessor server system a plurality of shelves 41 may be connected together via the core data network 330 under the control of a single management network utilizing one set of SMSs 338, 339. A set of SMSs 338, 339 may comprise a single SMS (as well as a plurality thereof). However use of at least two SMSs enables redundancy of components, therefore increasing overall system reliability.

A serial interface control 343 operable under telnet protocol control is also connected to the shelf 41 in the present example. This can provide a common operating system/boot console connection to the SSP 74 of both CSSPs 71 via an RJ45 connector on the rear panel of each CSSP enclosure.

Figure 6:
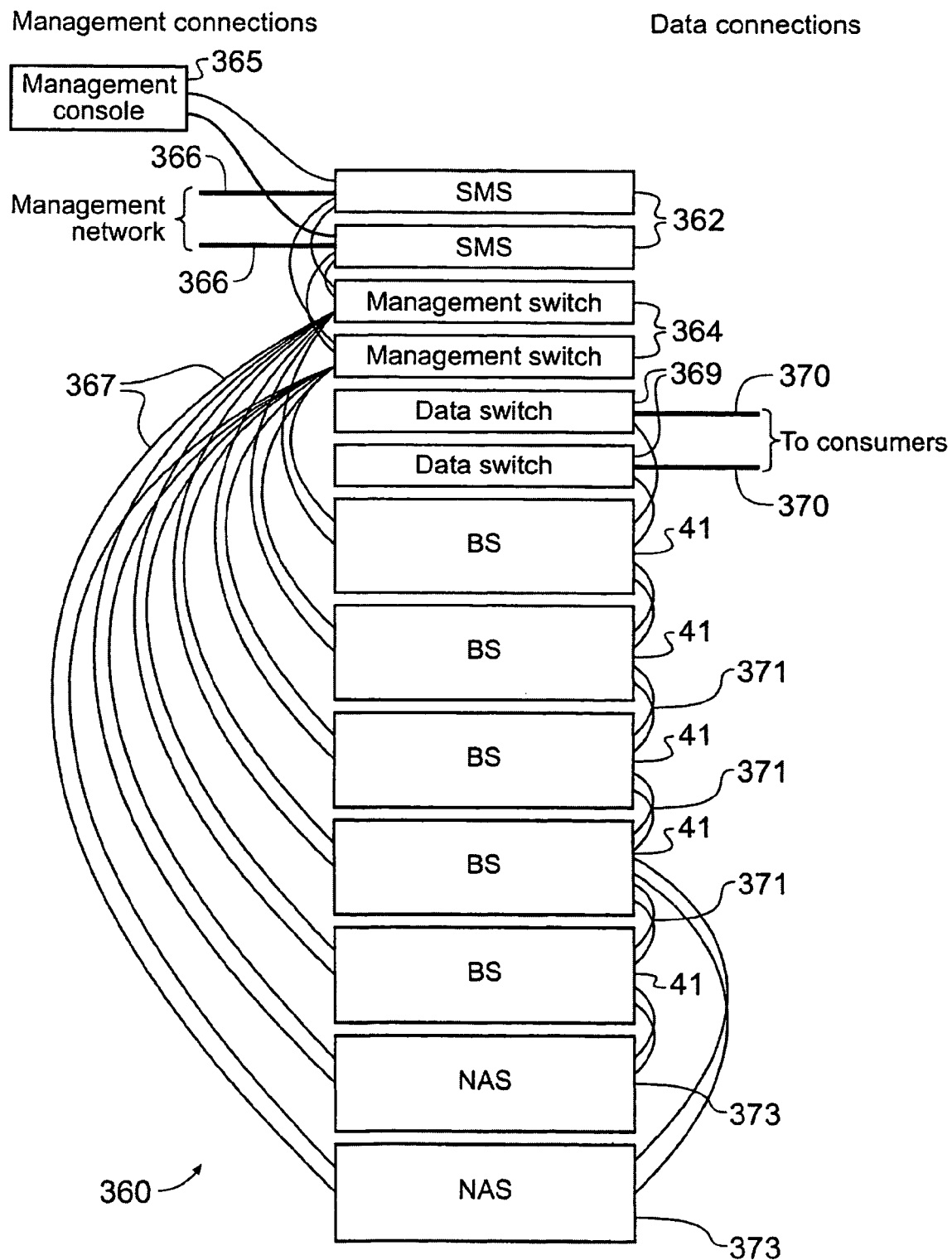
FIG. 6 is a schematic representation of a rack-mounted system comprising a plurality of such shelves.

FIG. 6 illustrates how a plurality of shelves can be configured within one (or more) racks to provide even higher processing power. Such a constellation of shelves to provide a large grouping of servers is sometimes termed a "web farm" or "server farm" 360. As shown in FIG. 6, the web farm comprises a plurality of shelves 41 that each carry a plurality of blades 43. Also provided are a plurality of Network Attached Storage devices (NAS) 373 for providing storage for critical data, e.g. email data storage, for the web farm. The NASs 373 are not required if there is no critical data to be stored, e.g. if the web farm is operating solely to provide web caching services.

Management control of the web farm 360 can be provided through a pair of System Management Servers (SMSs) 362. Each SMS 362 can be connected to a management network via a link 366 and to a management console 365. The SMSs 362 can communicate with the individual shelves 41 via a pair of management switches 364. Each shelf 41 and NAS 373 can be connected to each management switch 364 via a connection 367. Thus dual redundant management connections can be provided to each shelf 41 and NAS 373.

Flow of data to and from the web farm 360 can be provided through a pair of data switches 369. Each data switch 369 can be connected to a consumer network via a link 370. It is to be understood that the consumer network can be a larger data network to which the web farm 360 is connected. This network can be an office or corporation intranet, a local area network (LAN), a wide area network (WAN), the Internet or any other network. Connections between the data switches and the shelves 41 can be facilitated by connections 371. It is to be noted that as each shelf has its own switching capability, there is no need for each shelf 41 to be directly connected to the data switches 369. Connections can also be provided to connect the NAS units 373 to the shelves 41. The topology used for interconnection of the data switches 369, shelves 41 and NASs 373 can be any topology providing at least one connection of any length between every possible pair of units. Complex topologies arranged to minimize the maximum connection length between any two given units in the web farm can be used.

As an alternative to providing critical data storage within a NAS 373, such storage can be provided within one or more NAS cartridges fitted into one or more of the shelves 41 in place of processing cartridges 43. Another alternative is to provide a server shelf with local storage such as a RAID array (Redundant Array of Inexpensive Disks) in place of the NAS 373.

The system described above provides an example of a fully configurable computing system based on a plurality of self contained-field replaceable units (FRUs) and scalable from a single processing cartridge with power supply and switching capability to a multiply redundant multiprocessor server system with full system management capability extending over a number of co-operably connected server shelves. It will of course be readily apparent to the skilled reader that many of the specific features specified in the above description are in no way limiting and a variety of alternatives may be produced using only ordinary skill and common general knowledge.

For example, rather than the use of UltraSPARC™ processors in the information processing modules or in the CSSPs, other processors could be used. Also, multiple processors could be provided within a processing module. Each module within a shelf or a farm or shelves could run under the same operating system, or a plurality of different operating systems may be used. Also, it is not necessary that each processing cartridge within a shelf or farm be configured to run the same program software. For example, individual processing cartridges may be configured to execute, for example, fileserver software, mailserver software, webhosting software, database software, firewall software, or verification software. Further, although in the described example, the functionality of a switch and of a shelf service processor is provided within a single combined unit, separate switch and shelf service processor FRUs may be used. Also, although information signal connections based on an Ethernet protocol are described, other information signal communication protocols (e.g. Infiniband) could be employed. Similarly, a configuration of other than a pair of PSUs and a pair of CSSPs may be provided so as to provide an appropriate degree of FRU redundancy.

One aspect of ensuring maximum possible computer availability relates to service and management of a computer system. In particular, service and management functions are in general required for monitoring system status and performing control actions in response to monitored parameters. There now follows an example of how service functions may be implemented in a hierarchical manner through different components of a modular computer system.

As described above with reference to FIG. 3, each information processing cartridge 43 has a blade service controller 203. The blade service controller 203 is a local controller of service functions for each information processing cartridge 43. Each blade service controller 203 is arranged to be able to communicate with the SSP 74 (see FIGS. 4 and 6) of each CSSP 71 via the connections 226, 227 and 310. The SSP 74 provides shelf-level service functions for the population of each shelf 41, which includes the PSUs 81 and the switches 73 of the CSSPs 71 as well as the processing cartridges 43. Each SSP 74 is arranged to be operable to communicate with an external system management server (SMS) 338, 339 via I/O connector 273 as illustrated in FIG. 4A. The system management server provides system level service functions for one or more shelves 41. The system management server may also provide service functions to computer system modules other than shelves 41 within a computer system, for example to individual server units and/or to reliable storage units such as Network Addressable Storage (NAS) units.

In the present example, the blade service controller 203 can provide the following service functions. It typically performs environmental monitoring of the information processing cartridge 43 within which it is situated, this includes monitoring of CPU and ambient temperatures by means of the environmental monitor 215, monitoring of the power supply rails from the DC to DC converter 218 and monitoring of the speed of the processor cooling fan 214. The blade service controller 203 may also perform a watchdog function for monitoring the operating system running on the processor of the processing cartridge 43. The blade service controller 203 can also provide an out-of-band interface between the processing cartridge 43 and the CSSP 71. The out-of-band interface is a physically discrete interface, which is independent of the operating system, and applications running on the processor, this interface may be used for providing processor cartridge parameters to the shelf SSPs 74 at boot. In addition, the blade service controller 203 may also provide local functions for control of the LED service indicators 119 and control of power on reset (POR) and externally initiated reset (XIR) to the processor. In the present example, there is no requirement for the blade service controller 203 to have any level of intelligence, it being sufficient that it is capable of performing simple watchdog and threshold type monitoring operations. However, the blade service controller 203 my be implemented having intelligence, which may be of particular benefit in the event that it is tasked with more complex functions than those set out above.

The SSP 74 (of which two are typically provided within a shelf 41 to provide redundancy) provides the following functions in the present example. It typically performs environmental monitoring for the shelf 41, monitoring the PSUs 81, the CSSPs 71 and the PSU inputs. The SSP 74 can also aggregate data from the blade service controller 203 of each blade 43 present in the shelf. The SSP 74 may also be configured to make decisions regarding aspects such as power control, control of the shelf service indicator LEDs 69 and to provide instructions to the blade service controllers 203. In the present example, the SSP 74 is not responsible for deployment of software to individual processing cartridges, however this function may be provided by the SSP 74 in alternative arrangements.

In order to provide a facility for manual monitoring and control of the SSP 74, it may be configured to have a user interface via which a user can be provided access to the functions and data of the SSP 74. The user interface access may be provided through one of the external serial interface connection 311 and the external network connection 273. The SSP 74 may be operable to operate as an isolated unit with no higher level service control provided. In general the SSP 74 requires little or no user intervention to manage the operation of a single shelf 41.

Fault management may be controlled by the SSP 74 such that a failed processing cartridge 43 (the failure of which may be detected, for example, from data provided by a blade service controller 203 indicating a failure of the processing cartridge's operating system or application or from errors detected in the switch 73) may be remotely restarted by the SSP 73, in the present example either by initiating an externally initiated reset (XIR) to the processor of the processing cartridge, or by causing an interruption in the power supply to the processing cartridge sufficient to cause a power on reset (POR) to the processor of the processing cartridge. In the present example, a failed processing cartridge will be the subject of a predetermined number of restart attempts before that processing cartridge is considered permanently failed, at which time the processing cartridge is removed from service in that it is ignored by the SSP 74 and the switch 73 is instructed to pass traffic to it and to ignore any traffic from it and the failed nature is reported to any higher level service control to which the SSP 74 is connected.

In order to perform the above described functions, the SSP 74 of the present example is configured to have a degree of intelligence such that decision making steps and provision of a user interface are supported.

Figure 5:
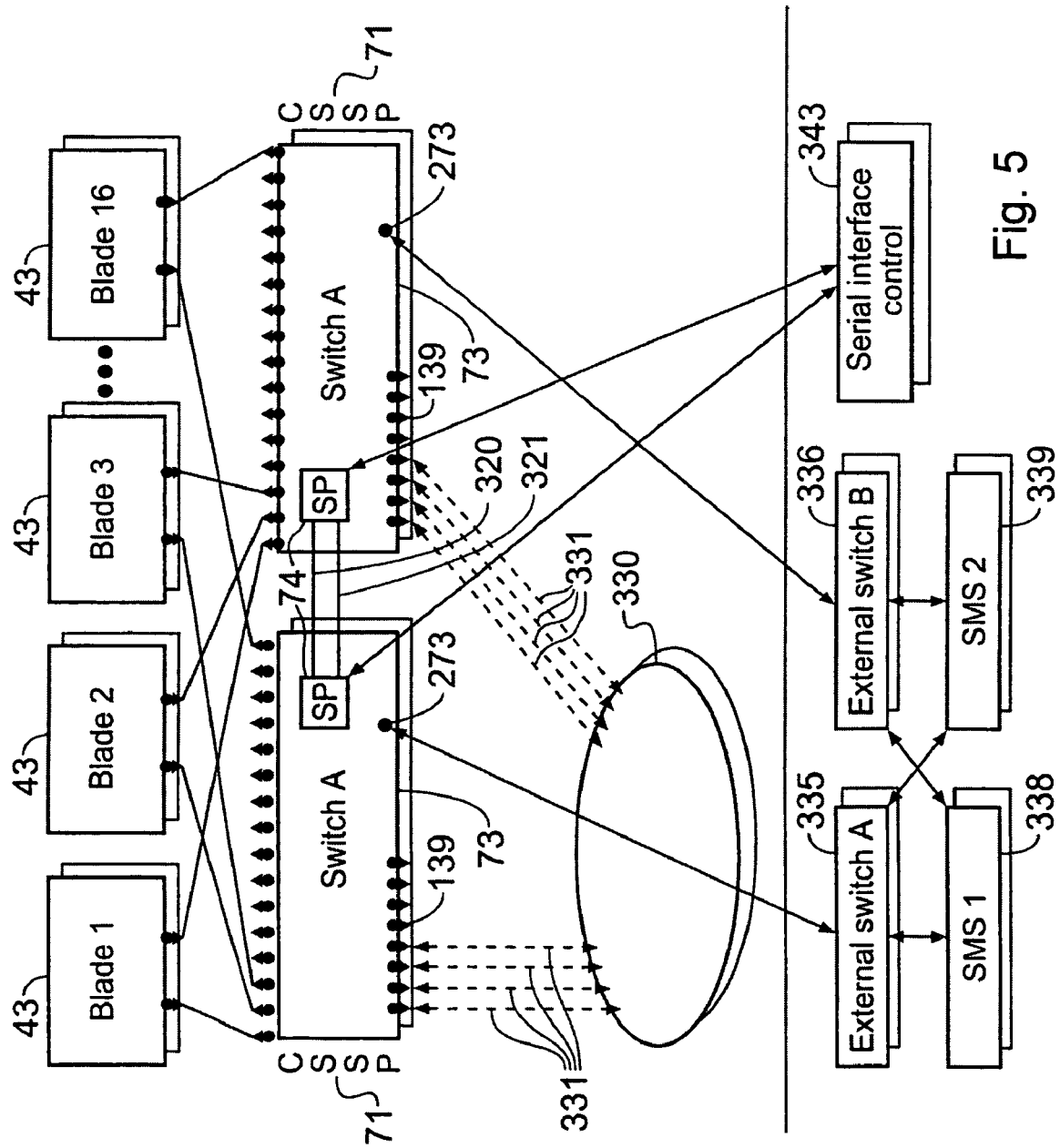
FIG. 5 is a functional block diagram showing the external connectivity of the shelf of FIG. 1.

The system management server (SMS), of which two (338 and 339) are typically provided as a clustered pair for redundancy (as illustrated in FIG. 5), is in the present example configured to provide the following functions. The primary use of the server management system 338, 339 of the present example is to provide aggregate management and monitoring for a number of shelves 41 (as illustrated in FIG. 6). By means of such aggregated monitoring and management, a single (clustered pair of) system management server(s) can oversee the running of a large number of computer system shelves 41.

The system management server (SMS) 338, 339 may also be operable to perform hardware fault failover in response to hardware failures detected by the system management server or reported to it by an SSP 74 of a particular shelf 41. In addition, the system management server 338, 339 of the present example may be operable to perform software deployment to individual-processing cartridges. In alternative arrangements, the system management server 338, 339 may be operable to allow platform specifics abstraction.

By "platform abstraction" is to be understood that the SMS 338, 339 may be operable to allow platform specific abstraction such that the user may configure computing services without knowledge of the underlying hardware providing these services. For example a user may require a web server which can cope with, say, 1000 connections per an hour. The SMS 338, 339 may be pre-configured with enough platform specific data to determine how many blade servers are required to fulfil this requirement, based on their processor, memory size, etc and provision the web service on that number of blade servers without the user needing to know anything about the server hardware details himself.

The operation of the system management server 338, 339 may be controlled via a management network 366, such that control may be automated (via a higher level of system management) or manual (via a terminal to the management network 366) or a mixture of both. The system management server 388, 399 may also be directly connected to a management terminal 365 for direct operator control of the particular system management server. In order that the above functions may be implemented in the system management server, the system management server may be configured to have a level of intelligence appropriate to the making of decisions and controlling of failover and deployment.

Providing management of a system such as that described above, requires there to be a way of modeling the logical and physical elements of the system. As has been described above, the Common Information Model (CIM) provides such a way of modeling the physical and logical elements of the system and the interaction between them. However, having a model is not in itself enough. There is also the need to be able to interface system objects to the model. As described in the introduction, although existing systems do allow for this, there is a need for a more flexible, extensible and dynamic approach that that provided by conventional approaches. Also, it would be desirable to hide the complexity of the CIM model from the instrumented modules. In this instance, the CIMOH on the SSP uses the shared provider to give the flexibility and complexity hiding required, so that the SSP can interface with the system management server described in the previous paragraph.

In an embodiment of the invention, an application program interface (API) implemented by a provider module is shared between a plurality of managed objects (management modules), whereby the functionality for interfacing a managed object to a management model can be concentrated at a shared component. This facilitates the creation of managed objects as they then do not need to know about how to interface with the management model. Also, a standard interface can be provided between the provider module and each of the management modules, which also facilitates the creation and integration of managed objects. An example of the invention can thus facilitate the provision of effective remote management of the components of such a network connected system or device as that described above.

An example of the present invention enables a collection of resources or components within an information system as described with reference to FIGS. 1 to 6 to be represented as a set of managed objects. The resources can include logical as well as physical entities. Such a representation can be used to facilitate the remote management of part or all of the system.

In the following, an embodiment of the invention will be described in terms of an implementation in the C programming language. It is, however to be noted that that is only one example of a programming language that could be employed, and that the invention is equally applicable to other programming languages.

Figure 7:
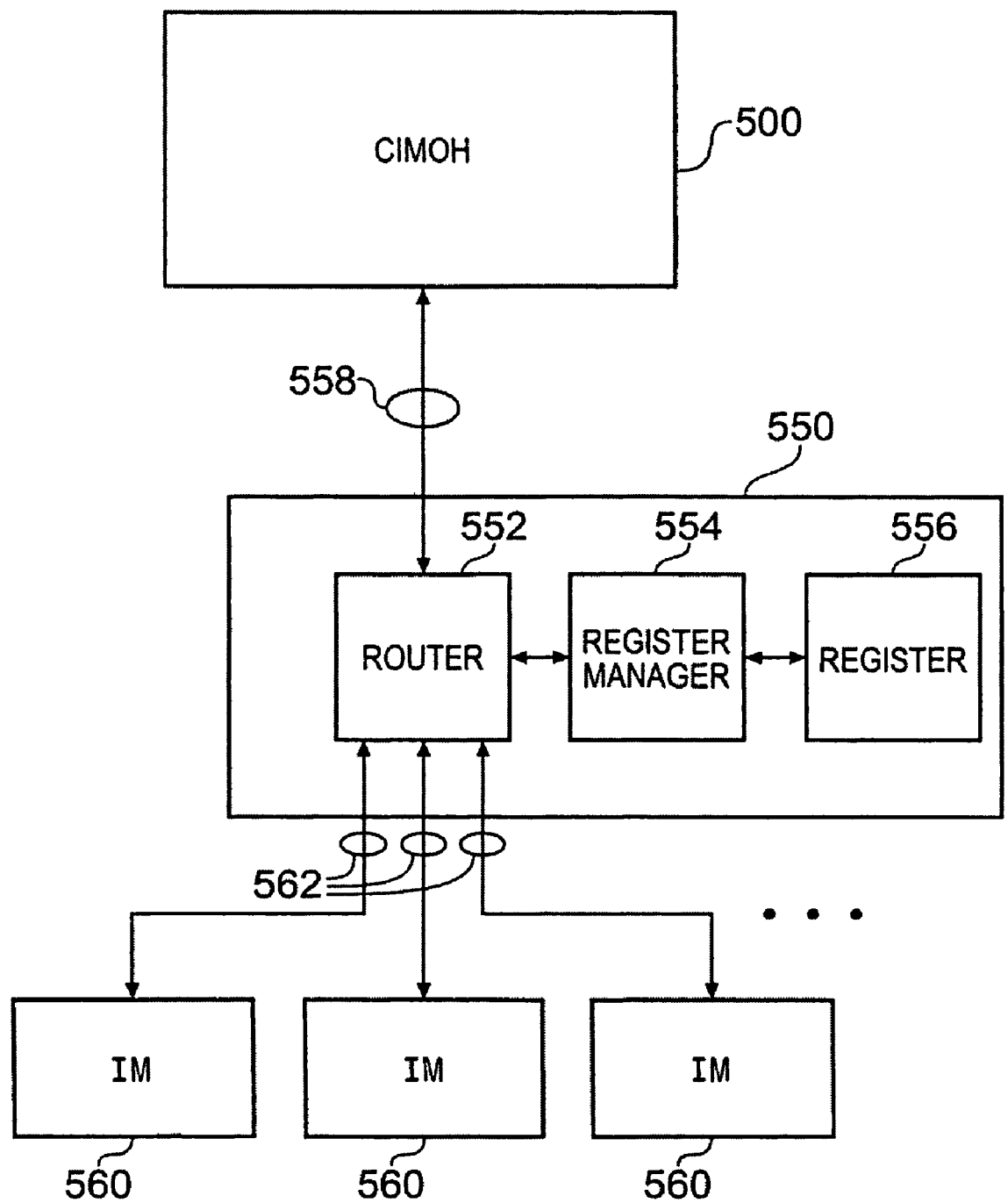
FIG. 7 is a schematic representation of functional components of an embodiment of the invention.

FIG. 7 illustrates an overview of an example embodiment of the present invention. In this embodiment, a shared provider module 550 provides an interface between a plurality of managed modules (the managed objects) 560 and a CIM Object Manager (CIMOM) or an CIM Object Handler (CIMOH). In the present instance a CIMOH 500, which can be though of as a limited CIMOM, is employed. The CIMOH does not provide for persistence of objects, but is supports CIM over an XML interface.

The shared provider module 550 can be implemented as a program product comprising one or more computer programs. In one example of the invention, one or more computer programs forming a common provider module 550 can be held in the memory 305 of the SSP 74 for controlling the processor 301 of the SSP. The provider module 550 can include a register manager 554 operable to maintain a register 556 of interfaced management modules and a router 552 operable to use the register to provide routing of a management request to a management module 560 appropriate to process the management request. The register can be held in the memory 196 or in the storage 205 of the information processing cartridge 43.

Figure 8:
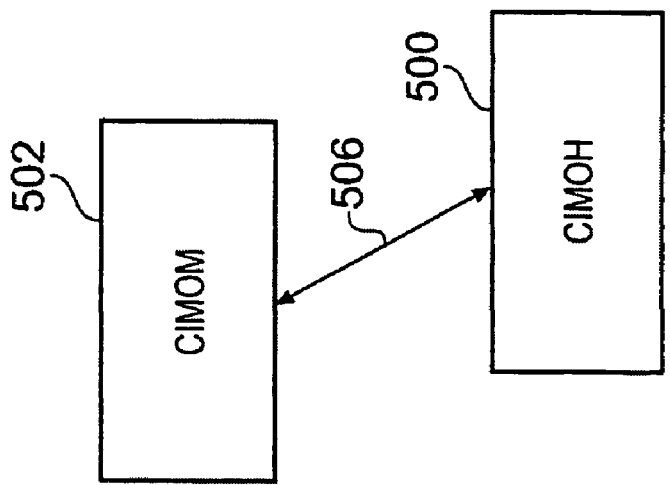
FIG. 8 is a schematic representation of an interrelationship between components of FIG. 7.

FIG. 8 illustrates an example of a relationship between a CIMOM 500 and a CIMOH 502. In the illustrated example, the CIMOM 500, which provides the overall management of management objects in accordance with the CIM, could be implemented in the management console 365. The CIMOM enables persistence of objects. The CIMOH 500 could be arranged to provide a subset of the object management tasks under the control of the CIMOM 502. The CIMOH would typically not, however, provide for persistence of objects. The CIMOH could be implemented in client system, for example in the management console 365 shown in FIG. 6. Communication between the CIMOM and the CIMOH could be effected, for example, using the XML markup language via a connection 504. Accordingly, a function of the CIMOH 500 in this implementation is to listen for and validate incoming requests, and to map incoming calls to corresponding cp_xxx( ) calls from a C Provider API.

Where reference is made here and later to "cp_xxx" calls (and also where reference is made later to "cim_xxx" calls) the "xxx" representation is intended to form a generalization of the various cim and cp calls (e.g., cp_getInstance and cp_getClass calls) that are possible.

The management modules 560 can be in the form of program objects that define parameters and status information for the modeled entities. For example a management module representative of a local sensor could identify the parameter being sensed (e.g. temperature) and the current value sensed by that sensor. A management module representative of a physical temperature sensor that realizes the logical sensor could identify the location of the temperature sensor, a serial number, etc. The management modules can provide instrumentation, and for this reason are also described herein as instrumented modules. The management modules provide the functionality to respond to get a get call to return the required response thereto.

In an embodiment of the invention, the management modules do not need to know the details of how to interface with the management model, but they merely need to include code to enable them to register with the provider module 550 as will be described later. As a result, a standard interface 560 at the level of the management modules can be provided, that reduces the complexity of the management modules 560 and thereby increases the reliability and reduces the cost and programming time of such management modules.

Indeed, the provision of a provider module that is shared between a plurality of management modules means that functionality for interfacing a management module to a management model can be concentrated at a shared component. The responsibility for interfacing with the CIMOH 500 (or a CIMOM 502) can be performed by the provider module 550 over the interface 558.

Moreover, as mentioned above, the use of the common provider module 550 facilitates the creation of management modules. This is because the management modules do not need to know about the interface 558 with the management model.

The provider module can be thought of as an applications program interface (API) to the management modules. The shared provider maps a standard Solaris C language API to the simpler API provided to the management modules, whereby the provider module only needs to hold class and instance information of the management modules. As mentioned above, the management modules can each be implemented as an instrumented module providing instrumentation functions.

An embodiment of the invention enables an instrumented task, that is a task that provides instrumentation functions, to register and deregister instances of objects it owns, as well as associated accessor functions, with the CIM via a shared provider.

An embodiment of the invention can remove the burden of processing management requests from the instrumented modules in order to provide CIM information and to reduce the programming needed in an instrumented module to support CIM.

This is achieved in that enumeration of class and instance names can be done completely by the shared provider. Get/set functionality can be implemented by the shared provider calling accessor functions registered with it by the instrumented modules. An embodiment of the invention also enables an instrumented module to map easily between its native structures and the CIM structures for representing data.

The register manager 554 can be operable to maintain in the register 554 at least one of class information and instance information. The router 552 can then be operable to use the registered class and/or instance information to determine a routing for a management request from the CIMOH 500 to a management module appropriate to process the management request.

Figure 9:
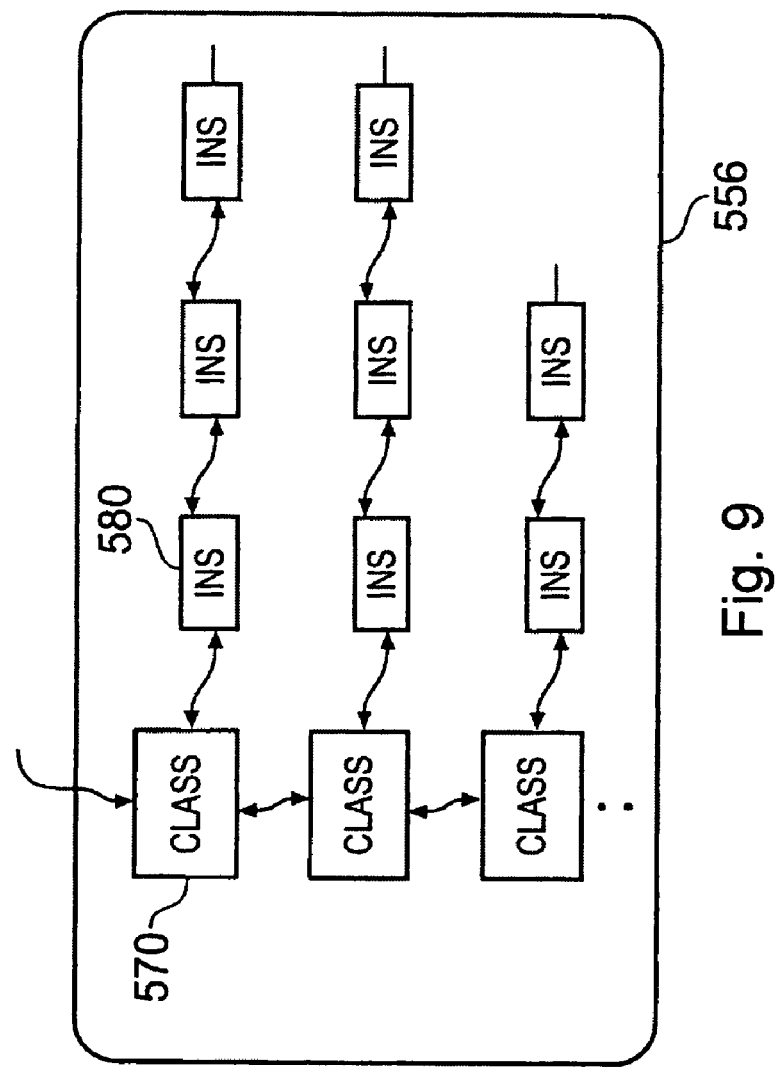
FIG. 9 is a schematic representation of the content of the registry.

FIG. 9 illustrates an example of the form of the registry 556.

The registry 556 provides storage for the class and instance information, and can take any suitable form. In the example shown in FIG. 9, the registered classes "CLASS" are held in a doubly linked list with, for each class, the instances "INS" of that class being held in respective linked lists Returning to FIG. 7, the described structure can enable a shared provider module to interface a CIMOH 500 to instrumented modules (IM) 560 where task specific information is kept in an implementation module 560 associated with that task. The shared provider enables the CIMOH 500 to access the task specific information in a uniform manner. This approach enables the shared provider to be decoupled from the details of each instrumented task (as opposed to one big provider for all SSP object information holding all the information and gathering it by low-level calls to each task/module).

As mentioned above CIMOH 500 forms a limited CIM Object Manager (CIMOM) at the level of the client (e.g., the management console 365 shown in FIG. 6) in that it is configured to handle the limited number of CIM objects held on the service processor and implements intrinsic methods available over the SMS-SSP interface.

As mentioned above, a function of the CIMOH 500 in this implementation is to listen for and validate incoming requests, and to map incoming calls to corresponding cp_xxx( ) calls from a C API.

The shared provider module 550 is operable to accept cp_xxx( ) function calls from the CIMOH 500 over the shared provider to object handler interface (hereinafter the SPOH interface 558). The shared provider module is also operable to accept the creation/deletion (registration/deregistration) of objects from the instrumented modules over the standardized shared provider to instrumented module interface (hereinafter the SPIM interface 562) and to present them to the CIMOH 500. The shared provider 550 can also be arranged to be responsible for any "global" SSP CIM objects that are not appropriate for any of the instrumented modules 560.

The shared provider 550 uses cim_xxx( ) calls from a CIM library (e.g., a Solaris CIM library or the like) to allocate the CIM structures for objects based on information provided by an instrumented module and calls get/set accessor functions in the instrumented module 560 to handle requests for that module. The shared provider 550 does not need to know about the contents of these objects, other than being able to call the accessor functions, according to an incoming CIM request that has been mapped to the cp_xxx call by the CIMOH.

Centralizing cim_xxx calls and cp_xxx calls (and associated memory allocation) in the shared provider module 550, enables realization of a number of advantages. It can allow for more efficient use of a shared object memory pool. It can also simplify the development of Instrumented modules, as the interface to the instrumented modules can be standardized. It can reduce the likelihood of programming errors in instrumented modules as a result of this simplification. It can also allow management requests to be handled at the level of the CIM task rather than the level of the task for the instrumented module.

The use of accessor functions in the present example that are provided by the instrumented module and are registered by the instrumented module with the shared provider, a number of further advantages can be realized. For example, the instrumented module does not need to know of any specific requirements that an object has before performing an operation (e.g. a module may have to do something before it can do a set). Also, it can avoid multiple copies of the same value being held. It can further avoid needing to send a message to the instrumented module and then carry out a context switch to perform the operation if the instrumented module is a separate task.

The alternative to the use of an accessor function or another similar function would be for the shared provider to hardcode the function calls for each CIM class that is implemented. However, this would mean the shared provider would have to change each time a new module was added with a new CIM class or if the instrumented module changed.

The instrumented modules 560 can be responsible for performing a number of different functions. For example, they can be responsible for the registration/deregistration of objects they own with the shared provider. They can also be responsible for providing pointers to get, set accessor functions for those objects and their properties to the shared provider. They can further be responsible for providing pointers to so-called CIM extrinsic functions, for those objects that implement them, to the shared provider. They can also be responsible for updating the contents of those objects, for example by using some of the same set functionality it registered with the shared provider and handling any locking required for this.

In operation, various types of request can be handled. Examples of possible types of requests are set out below:

enumerateClass, enumerateClassName requests could be handled by the shared provider (as mentioned above this could alternatively, or in addition, be handled by the CIM Object Handler by extending the SPOH interface);

enumerateInstance, enumerateInstanceName requests could be handled by the shared provider based on information provided by the instrumented modules;

getInstance, getProperty, setProperty requests could be handled by the shared provider by calling accessor functions provided by the instrumented modules;

extrinsic method calls of a particular object could be handled by the shared provider calling that method using a function pointer provided by the instrumented Module.

The SPIM interface can allow an instrumented task to register/deregister instances of the objects it owns (and their associated accessor functions) with the CIM object handler via the shared provider.

This interface can enable the removal from instrumented modules of the burden of processing management requests from one of the other interfaces with respect to providing CIM information. In other words, it can avoid the need for an instrumented module to know about the complexity of making cim_xxx calls. Also, it can simplify the programming required in an instrumented module to support CIM.

As such, enumeration of class and instance names can be done completely by the shared provider and get/set functionality can be implemented by the shared provider by calling accessor functions registered with it by the instrumented module. As mentioned above, this interface can also minimize the amount of cim_xxx calls that need to be done in the instrumented module. It can further allow an instrumented module to map easily between its native structures representing this data and the more involved CIM structures.

In an embodiment of the invention, an instrumented module can use the library function illustrated in Table 1 to send a message to the shared provider to register the instrumented module's name and version with the shared provider.

TABLE 1 unsigned long im_registerIModule( char* moduleName, unsigned long module Version)

The instrumented module then waits for this call to complete (a response is returned by the shared provider), before it makes any further calls to the shared provider. If the calls times out or fails to return successfully, the library function will log this as an error event. The instrumented module does not then do any further calls to the shared provider. This is a largely transparent operation. However, it could also be used by the shared provider as a basis for permitting operations on a per module basis or for specific calls to see if a required module has registered. This call could also be useful, for example, to register an instrumented module providing specifically SNMP information, which an SNMP agent could check for using a sp_getNamespaces function. A module handle (moduleHandle) used to reference the instrumented module is returned in response to the registerIModule call to the instrumented module.

A deregister module call as illustrated in Table 2 can be used in an example of an embodiment of the invention to deregister the instrumented module. It can also deregister any objects that were registered by this module.

TABLE 2 void im_deregisterIModule( unsigned long moduleHandle, char* moduleName)

An add class call as illustrated in Table 3 can be used in an example of an embodiment of the invention to register with the shared provider the class definition and accessor functions for a class for which that an instrumented module is going to implement instances.

TABLE 3 unsigned long im_AddClass( unsigned long moduleHandle, IMClass* pClass)

This call requires the moduleHandle returned by the registerIModule call. The AddClass call returns a class handle (classHandle) to use to reference this class definition. The class handle can be used, for example, by the shared provider to index a lookup table of the class definitions.

Each class under the control of this module must be registered with the Shared Provider by this call. Information provided by this call will be used by the Shared Provider to handle requests to enumerate instances and classes.

The following data structures can be provided for use by the shared provider:

For example, in a "C" programming environment, an instrumented module can be arranged to allocate and to set up an IMClass struct for each class to be passed to the shared provider as a pointer. This allows the shared provider to build up appropriate CIM structures. This provides a template to use to avoid all of this information having to be passed by the instrumented module to the shared provider for each instance of the class.

An example of this is illustrated in Table 4 below.

TABLE 4

```
typedef cimchar* (*getFunction)(unsigned long, cimchar*)
typedef CCIMPropertyList* (*getAllFunction)(unsigned long)
typedef CIMBool (*setFunction)(unsigned long, cimchar*, cimchar*)
struct _IMClass {
CIMBool           classCIM;              /* True for CIM
                                            classes, */
                                         /* False for SNMP ones */
char*             className;             /* Textual or could
                                            be OID */
                                         /* for SNMP
                                            class */
char*             classNameSpace;        /* TBD - may be
                                            different */
                                         /* for non CIM objects, */
                                         /* e.g. the OID
                                            for an */
                                         /* SNMP table */
int               numProperties;         /* Needed? */
CCIMPropertyList* pClassProperties;
getAllFunction    pClassGetAllFunction;
   getFunction    pClassGetFunction;
   setFunction    pClassSetFunction;
int               numMethods;            /* Needed? */
classMethod*      classMethods;
}
typedef struct _IMClass IMClass;
```

It will be noted that the example shown in Table 4 effectively combines CCIMObjectPath and CCIMInstance structs from the Solaris CIM library and adds pointers to Get and Set Functions. It uses a list of CCIMProperty structures, one per property of the class. It will also be noted that the mValue, mObjPathValue and mInstanceValue are redundant in this case.

Prototypes for get and set functions are illustrated in Tables 5 to 7.

TABLE 5 cimchar* getFunction(unsigned long InstHandle, cimchar* propName)

In the examples shown in Tables 5 to 7, InstHandle is the Instrumented Module's handle to access its native storage for a specific instance of this Class and the propName is the particular property to return. The getFunction is operable to convert the property from its native form to cimchar (using cim_xxx helper functions) before returning.

TABLE 6

CCIMPropertyList* getAllFunction(unsigned long InstHandle)

The InstHandle in Table 6 is as described for Table 5. This example returns a list of all properties for this instance. It could be used to get the entire contents of a row in an SNMP table, if the instHandle was the OID used as the className with the index appended.

TABLE 7

CIMBool setFunction(unsigned long InstHandle, cimchar* propName, cimchar* propNewValue)

The InstHandle in Table 7 is as described for Table 5. The propName is the property to set and the propNewValue is the string form of the new value. The setFunction must convert this to the appropriate native type in the native storage specified by InstHandle.

A propName that does not support set or any other set failure will result in cim_false being returned.

TABLE 8

```
typedef CCIMProperty (*extFunction)(CCIMPropertyList*,
CCIMPropertyList*)
    struct _IMClassMethod {
        char*               methName;
        CCIMPropertymethReturn;
        extFunction         methFunction;
        CCIMPropertyList*   methInArgs;
        CCIMPropertyList*   methOutArgs;
        classMethod*        methNext;   /* For other methods in
this class */
    }
```

The CCIMProperty identified in Table 8 is defined as part of the Solaris CIM provider API mentioned earlier.

An Instrumented Module provides structures as illustrated above and support accessor functions, thereby allowing access to each property and method that it wants to be made visible to the management framework.

Before freeing memory associated with a class, an instrumented module makes a remove class call as illustrated in Table 9.

TABLE 9

| im_removeClass( | unsigned long Handle, |
|  | IMClass* pClass) |

An instrumented module can make a call to add an instance as illustrated in Table 10.

TABLE 10

| unsigned long im_addInstance( | unsigned long moduleHandle |
|  | unsigned long classHandle, |
|  | unsigned long InstHandle, |
|  | CCIMPropertyList* keyProperties) |

This call requires the moduleHandle returned by the registerIModule call and the classHandle returned by the addClass call. It can pass a list of the key properties for this instance with mValues filled in that will allow the shared provider to match requests to this instance and call the get set functions on it as appropriate. It will also pass in the InstHandle to identify its native storage for this instance and which the shared provider will store and pass in as a parameter in accessor functions. The interpretation of this handle is up to the instrumentation module that issued it. The shared provider simply maintains the InstHandle and passes it back to the instrumentation module in the accessor functions. Each instance under the control of an instrumented module can be registered with the shared Provider using a call of this type.

Table 11 illustrates an example of a remove instance module.

TABLE 11

| im_removeInstance( | unsigned long moduleHandle, |
|  | unsigned long classHandle, |
|  | unsigned long instanceHandle) |

Figure 10:
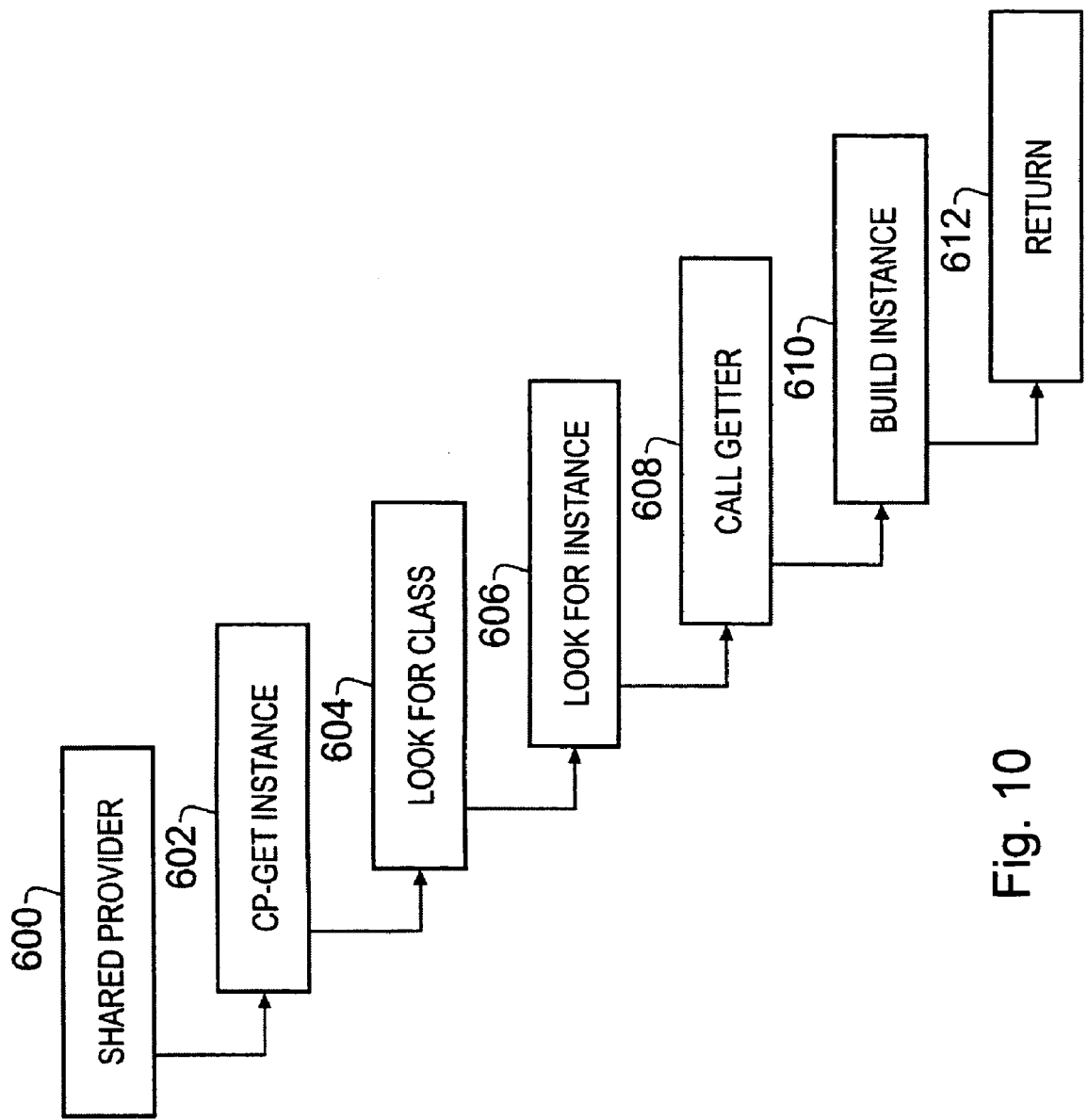
FIG. 10 illustrates the accessing of management information using an embodiment of the invention.

FIG. 10 illustrates a sequence of operations for building an instance of a managed object (or instrumented module) using an embodiment of the invention.

In step 600, the CIMOH receives a request for an object.

In step 602 the CIMOH makes a cp-get instance call.

In step 604 the shared provider responds to the cp-get instance call and the relevant class is looked for in the registry.

In step 606 the relevant instance of that class is looked for in the registry.

In step 608 the getter is called for that instance as was registered using the im_addClass call of Table 3.

In step 610 the instance is build for return.

In step 612, the build instance is returned by the CIMOH.

Accordingly, there has been described a provider module that can be operable to provide an interface to each of a plurality of management modules. The provider module can include a register manager operable to maintain a register of interfaced management modules and a router operable to use the register to provide routing of a management request to a management module appropriate to process the management request. Sharing the provider module between a plurality of management modules facilitates the creation and integration of the management modules.

Although the embodiments above have been described in considerable detail, numerous variations and modifications will become apparent to those skilled in the art once the above disclosure is fully appreciated. Indeed, it will be appreciated that the invention is of wide application, and that its application to a multiprocessor computer system as described with reference to FIGS. 1 to 6 is by way of example only.

What is claimed is:

1. A provider module for an information system, wherein the provider module is operable to provide an interface to each of a plurality of management modules, the provider module comprising:
   a register manager operable to maintain a register of interfaced management modules; and
   a router operable to use the register to provide routing of a management request to a management module;
      wherein, in response to receiving the management request, the router is configured to use at least one of management module, class and instance information from the management request to access the register to determine a routing for the management request to a management module appropriate to process the management request;
      wherein, in response to receiving a register module request from a management module, the register manager is configured to add the management module to the register and to return a handle for the management module to the management module;
      wherein, in response to receiving a register class request from a management module, which register class request includes the handle for the management module, the register manager is configured to add a class definition for the management module to the register and to return a handle for the class to the management module; and
      wherein, response to receiving a register instance request from a management module, which register class request includes the handle for the management module and a handle for a class, the register manager is configured to add an instance definition for the management module to the register and to return a handle for the instance of the management module.

2. The provider module of claim 1, wherein the register manager is further operable to maintain in the register at least one of class information and instance information.

3. The provider module of claim 1, wherein the register manager is responsive to a register module request from a management module to add the management module to the register and to return a handle for the management module to the management module.

4. The provider module of claim 3, wherein the register manager is responsive to a register class request from a management module, which register class request includes the handle for the management module, to add a class definition for the management module to the register and to return a handle for the class to the management module.

5. The provider module of claim 4, wherein the register manager is responsive to a register instance request from a management module, which register class request includes the handle for the management module and a handle for a class, to add a instance definition for the management module to the register and to return a handle for the instance to the management module.

6. The provider module of claim 1, wherein, in response to receiving a deregister module call from a management module, the register manager is configured to deregister the management module from the register and to deregister instances of objects that were registered by the management module.

7. The provider module of claim 1, wherein the management module is an instrumented module providing instrumentation functions.

8. The provider module of claim 1, comprised in a management subsystem including at least one management module and an object handler, wherein the object handler is connectable to a network, wherein the object handler is operable to receive a management request and being is responsive thereto to call the service provider to route the management request to a management module appropriate to process the management request.

9. The provider module of claim 8, wherein the object handler is responsive to CIM management requests.

10. The provider module of claim 8, wherein the provider module is interfaced to each management module via a standard interface.

11. The provider module of claim 8, wherein the management module is operable to register objects owned by the management module with provider module.

12. The provider module of claim 11, wherein the management module is in the form of an instrumented module providing instrumentation functions.

13. A method of managing objects in an information system including a provider module operable to provide an interface to each of a plurality of modules, the method comprising:
   maintaining a register of interfaced management modules; and
   routing a management request to a management module;
      wherein, in response to receiving the management request, using at least one of management module, class and instance information from the management request to access the register to determine a routing for the management request to a management module appropriate to process the management request;
      wherein, in response to receiving a register module request from a management module, adding the management module to the register and returning a handle for the management module to the management module;
      wherein, in response to receiving a register class request from a management module, which register class request includes the handle for the management module, adding a class definition for the management module to the register and returning a handle for the class to the management module; and
      wherein, response to receiving a register instance request from a management module, which register class request includes the handle for the management module and a handle for a class, adding an instance definition for the management module to the register and returning a handle for the instance of the management module.

14. The method of claim 13, wherein the management modules are configured as instrumented modules providing instrumentation functions, wherein the provider module maintains a register of interfaced instrumented modules and of objects corresponding to the interfaced instrumented modules.

15. The method of claim 13, wherein the provider module registers accessor functions for objects maintained by the instrumented modules.

16. The method of claim 15, further comprising the provider module using accessor functions registered for objects maintained by the instrumented modules to identify an appropriate instrumented module to process a management request.

17. A carrier computer readable storage medium comprising program instructions, wherein the program instructions are computer executable to form a provider module for an information system, the provider module being operable to provide an interface to each of a plurality of management modules and including:

a register manager operable to maintain a register of interfaced management modules; and a router operable to use the register to provide routing of a management request to a management module;

wherein, in response to receiving a management request, the router is configured to use at least one of management module, class and instance information from the management request to access the register to determine a routing for the management request to a management module appropriate to process the management request;

wherein, in response to receiving a register module request from a management module, the register manager is configured to add the management module to the register and to return a handle for the management module to the management wherein, in response to receiving a register class request from a management module, which register class request includes the handle for the management module, the register manager is configured to add a class definition for the management module to the register and to return a handle for the class to the management module: and wherein, response to receiving a register instance request from a management module, which register class request includes the handle for the management module and a handle for a class, the register manager is configured to add an instance definition for the management module to the register and to return a handle for the instance of the management module.

18. The computer readable storage medium of claim 17, wherein the register manager is further operable to maintain in the register at least one of class information and instance information.

19. The computer readable storage medium of claim 17, wherein the register manager is responsive to a register module request from a management module to add the management module to the register and to return a handle for the management module to the management module.

20. The computer readable storage medium of claim 19, wherein the register manager is responsive to a register class request from a management module, which register class request includes the handle for the management module, to add a class definition for the management module to the register and to return a handle for the class to the management module.

21. The computer readable storage medium of claim 20, wherein the register manager is responsive to a register instance request from a management module, which register class request includes the handle for the management module and a handle for a class, to add a instance definition for the management module to the register and to return a handle for the instance to the management module.

22. The computer readable storage medium of claim 17, wherein the register manager is responsive to a deregister module call from a management module, to deregister the management module from the register and to deregister instances of objects that were registered by the management module.

23. The computer readable storage medium of claim 17, wherein the management module is an instrumented module providing instrumentation functions.

24. A system comprising:

a plurality of management modules;

a processing unit coupled to the management modules, wherein the processing unit includes a provider module is operable to provide an interface to each of a plurality of management modules, the provider module comprising:

a register manager operable to maintain a register of interfaced management modules; and a router operable to use the register to provide routing of a management request to a management module;

wherein in response to receiving the management request, the router is configured to use at least one of management module, class and instance information from the management request to access the register to determine a routing for the management request to a management module appropriate to process the management request;

wherein, in response to receiving a register module request from a management module, the register manager is configured to add the management module to the register and to return a handle for the management module to the management module;

wherein, in response to receiving a register class request from a management module, which register class request includes the handle for the management module, the register manager is configured to add a class definition for the management module to the register and to return a handle for the class to the management module; and wherein, in response to receiving a register instance request from a management module, which register class request includes the handle for the management module and a handle for a class, the register manager is configured to add an instance definition for the management module to the register and to return a handle for the instance to the management module.

* * * * *